Oct. 11, 1938.                J. H. DORAN                2,133,135
                                GEARING
                            Filed July 6, 1935
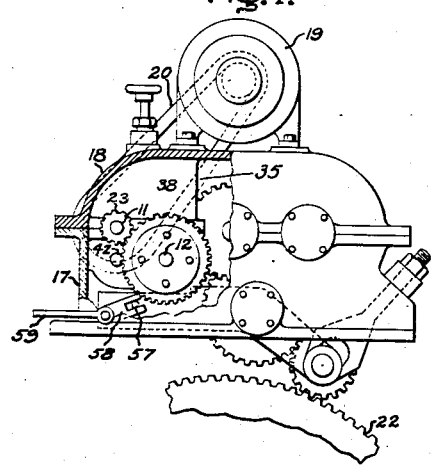
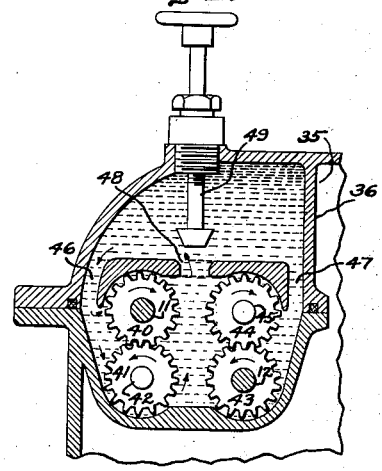
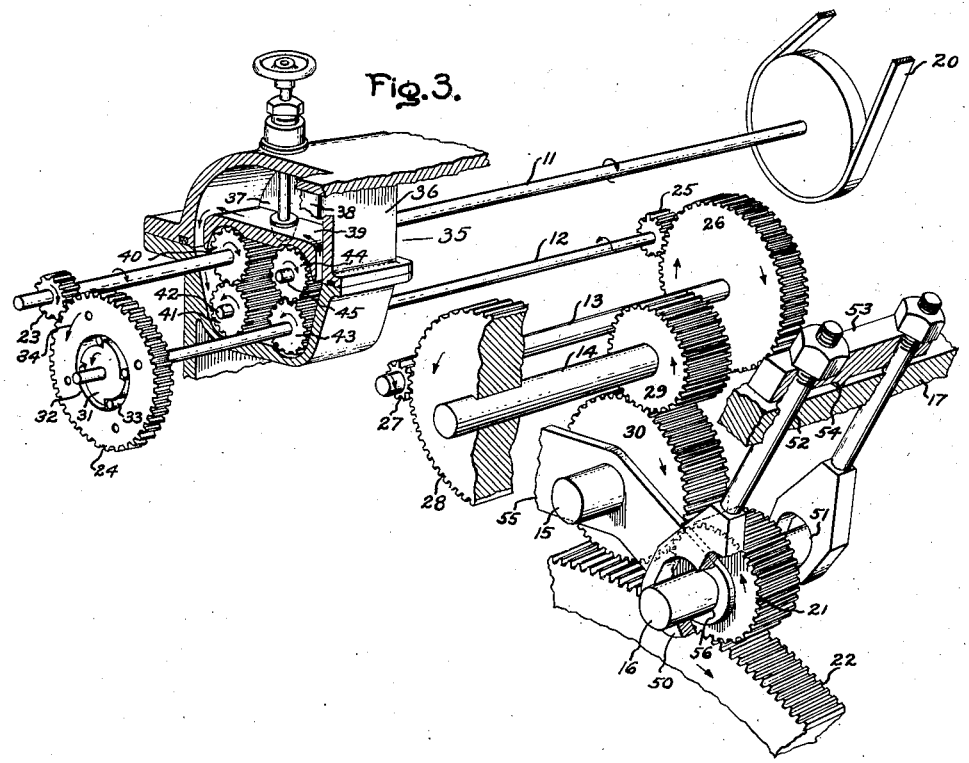
Inventor:
John H. Doran
by Harry E. Dunham
His Attorney.

Patented Oct. 11, 1938

2,133,135

UNITED STATES PATENT OFFICE 2,133,135

GEARING

John H. Doran, Scotia, N. Y., assignor to General Electric Company, a corporation of New York Application July 6, 1935, Serial No. 30,086

4 Claims. (Cl. 74—368)

The present invention relates to gearings such as are used for example for slowly rotating the rotor of an elastic fluid turbine after the turbine has been shut down in order to cause uniform cooling of the rotor and thereby to prevent sagging thereof.

In steam turbine practice it has been found desirable to turn the rotor of the turbine after having been shut down at a speed of the order of 2 R. P. M. The gearings provided for this purpose usually have a considerable speed reduction to permit driving of the heavy rotor by means of a comparatively small, high speed motor. In certain instances, such as where a turbine has to be synchronized with other turbines, it has been found desirable to revolve such turbine by means of a separate motor at a higher speed of the order of 10 R. P. M. This would ordinarily necessitate the provision of a gearing having a smaller ratio than the one mentioned above and consequently a heavier motor to overcome the inertia of the turbine rotor during starting.

The object of the present invention is to provide an improved gearing for driving a turbine rotor or like rotatable element having considerable inertia at different speeds by means including a single, comparatively small, high speed drive motor.

Another object of my invention is to provide an improved gearing in which certain gears align themselves automatically, thereby insuring uniform pressure along the entire length of the teeth.

For a consideration of what I believe to be novel and my invention, attention is directed to the following description and the claims appended thereto in connection with the accompanying drawing.

In the drawing, Fig. 1 represents a front view, partly in section, of a gearing arrangement embodying my invention; Fig. 2 is an enlarged, sectional, detailed view of Fig. 1; and Fig. 3 illustrates a perspective, exploded view of certain parts of Fig. 1.

The arrangement shown in the present instance is especially adapted for slowly rotating a turbine rotor at two different speeds of the order of 2 and 10 R. P. M. respectively. The gearing has a plurality of parallel shafts 11, 12, 13, 14, 15 and 16 respectively. These shafts are supported on a gearing casing having a lower half 17 and an upper half 18. The first shaft 11 is driven by an electric motor 19 connected to the shaft 11 by a belt drive 20. The last shaft 16 serves to drive a turbine rotor and to this end is provided with a gear 21 arranged to mesh during starting with a gear 22 secured to and forming a part of a turbine rotor. Torque is transmitted from the shaft 11 to the shaft 12 by means including a small gear 23 secured to the shaft 11 and a large gear 24 associated with the shaft 12. The shafts 12 and 13 are connected by gears 25, 26. Similar gears 27, 28 transmit power between the shafts 13 and 14, and other reducing gears 29, 30 transmit torque between the shafts 14 and 15. The gear 30 meshes with the gear 21 which latter may be moved into and out of engagement with the turbine gear 22. The direction of rotation of the different shafts and gears is indicated by arrows.

With the arrangement so far described a certain turbine rotor may be started and revolved at a certain speed which may be of the order of 2 R. P. M. In accordance with my invention, means are provided for increasing this speed or, from another viewpoint, for reducing the ratio of the gearing in order to revolve this same turbine rotor at a speed of for instance 10 R. P. M. This means comprises a hydraulic coupling between two of the shafts for reducing or changing the speed radio between such shafts, and means for automatically rendering one of the gears inoperative in response to operation of the hydraulic coupling. In the present instance these means are associated with and connected between the first shaft 11 and the second shaft 12. The gear 24 is connected to the shaft 12 by a free-wheeling clutch comprising a toothed or recessed clutch member 31 disposed in a central opening 32 of the gear 24 and a plurality of rollers 33 interposed between the clutch member 31 and the adjacent wall of the gear 24 to effect torque transmission from the gear to the shaft 12. Any well known free-wheeling clutch may be used for this purpose. During operation, rotation of the gear 24 in the direction of the arrow 34 causes the rollers 33 to be wedged between the gear 24 and the clutch member 31 and thereby to effect rotation of the latter and consequently of the shaft 12. The free-wheeling clutch at the same time permits free-wheeling of the shaft, that is, rotation of the latter at a speed higher than the speed at which it can be driven from the shaft 11 through the gears 23 and 24. Assuming that the shaft 12 is rotated by its connection with the shaft 11 through gears 23 and 24, if now the speed of the shaft 12 is increased, then the same increase will take place with respect to the clutch member 31 whereby the connection between this clutch member and the gear 24 through the rollers 33 is rendered inoperative. From another viewpoint, the rollers 33 are relatively retarded, that is moved out of their wedging or locking position, hence no longer connect the clutch member 31 with the gear 24. Under this condition the gear 24 will continue to rotate but will no longer transmit torque to the shaft 12. The gear 24 then rotates or wheels freely. The rotation of the gears 23 and 24 in the present instance is of the order of 5:1, five revolutions of the first shaft effecting one revolution of the second shaft. The aforementioned hydraulic coupling means serves to reduce this speed ratio. In the present instance I have shown a coupling 35 to drive the second shaft 12 from the first shaft 11 at a speed ratio of about 1:1. The hydraulic coupling comprises a casing having a side wall 36, a rear wall 37 and a front wall 38 united with the walls of the lower and upper casing halves 17 and 18. A partition 39 united with the rear wall 37 and the front wall 38 defines an upper or by-pass space and a lower or pump space. Two positive displacement pumps, in the present instance gear pumps are provided in the lower space, a first pump including a gear 40 secured to the shaft 11 and meshing with a gear 41 secured to a shaft 42, and a second pump including a gear 43 secured to the shaft 12 and meshing with a gear 44 secured to a shaft 45. The partition, together with the adjacent walls of the casing, defines an inlet channel 46 for the first pump and a discharge channel 47 for the second pump. During operation, rotation of the first pump causes fluid to flow from the upper space through the inlet channel 46 and the first pump. This fluid then acts as a drive fluid for the second pump, which may be termed a pump motor, causing rotation of the latter in the direction of the arrows (Fig. 2). The fluid is discharged through the channel 47 into the upper space to be recirculated through the first pump. The partition 39 has an opening 48 which may be closed by means of a hand-operated valve 49. As long as the valve 49 is closed the fluid discharged by the first pump is forced through the second pump, causing operation of the latter, that is, rotation at substantially the same speed at which the first pump is operated. If, however, the valve 49 is open, the major portion of the fluid discharged by the first pump flows through the opening 48 into the upper space. This upper space then acts as a bypass for the first pump, rendering the latter inoperative as regards power transmission therefrom to the second pump.

When a turbine rotor is to be started, the valve 49 is open. Power transmission then from the first shaft 11 to the second shaft 12 is effected through the gears 23, 24, as described above, resulting in rotation of the turbine rotor at a speed of approximately 2 R. P. M. In order to increase this speed to, for instance, 10 R. P. M., the valve 49 is closed so as to render the hydraulic power transmission from the shaft 11 to the shaft 12 operative. This causes an increase in speed of the shaft 12 to a speed substantially the same as that of the shaft 11 and at the same time renders the power transmission between the mechanical gears 23, 24 inoperative in the manner stated above.

The gear 21 secured to the shaft 16 normally has the lowest speed and is accordingly subjected to a high specific tooth pressure. It is therefore important with respect to this gear that the torque be uniformly transmitted through the entire length of its teeth. To this end the gear is yieldingly supported so that it may adjust itself during operation. In the present instance the gear shaft 16 projects through eye bolts 50 having longitudinal openings 51. These eye bolts extend through openings 52 in the lower half 17 of the gearing casing and are fastened to the ends of a bracket 53 having a knife edge 54 resting on the casing half 17. The gear 21 may be moved into and out of engagement with the gear 22 on the turbine rotor by means including a lever 55 on each side of the gear. Each lever 55 is fulcrumed on the shaft 15 and has an end portion with an opening 56 through which the shaft 16 extends. The other ends of the levers 55 are connected by a pin 57. The latter is engaged by a fork 58 secured to a lever 59 (Fig. 1). Upward movement of the free end of the lever 59 causes upward movement of the gear 21 whereby the latter is removed from its engagement with the gear 22.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. A gearing including a first shaft, a second shaft, a gear on the first shaft meshing with a gear on the second shaft to change the speed of the second shaft with respect to that of the first shaft, one of the gears being directly secured to one of the shafts, means including a free-wheeling clutch for connecting the other gear to the other shaft, a hydraulic coupling connected between the shafts, and means for rendering the hydraulic coupling operative to cause the free-wheeling clutch to overrun and to effect power transmission between the shafts through said hydraulic coupling, the hydraulic coupling having a different torque transmission ratio than that of the gears.

2. A gearing including a first shaft, a second shaft, a gear on the first shaft, another gear of larger diameter meshing with the first gear, a free-wheeling clutch between the other gear and the second shaft whereby torque is transmitted from the first shaft to the second shaft at reduced speed, and means for transmitting torque from the first shaft to the second shaft at less reduction consisting of a hydraulic coupling connected between the shafts, said coupling comprising two pumps, a first pump driven from the first shaft and a second pump for driving the second shaft and receiving fluid from the first pump.

3. A gearing including a first shaft, a second shaft, a gear on the first shaft, another gear of larger diameter meshing with the first gear, a free-wheeling clutch between the other gear and the second shaft, and means including a hydraulic coupling for transmitting torque from the first shaft to the second shaft at a different ratio than that of the gear, said coupling comprising a first gear pump having a gear secured to the first shaft and a second gear pump having a gear secured to the second shaft and arranged to receive fluid discharged from the first gear pump.

4. A gearing including a casing, a plurality of shafts supported on the casing, speed-reducing gear means connecting the shafts, and means including a hydraulic coupling having a casing formed at least partly by the first named casing for rendering at least one of said gears inoperative and to effect a different torque transmission ratio between two shafts.

JOHN H. DORAN.